(12) United States Patent
Eberhardt

(10) Patent No.: US 6,443,603 B1
(45) Date of Patent: Sep. 3, 2002

(54) PROCESS AND APPARATUS FOR THE CONTROL OF THE LIGHT DISTRIBUTION OF A HEADLIGHT ARRANGEMENT OF A VEHICLE

(75) Inventor: Stefan Eberhardt, Backnang (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/692,326

(22) Filed: Oct. 20, 2000

(30) Foreign Application Priority Data

Oct. 20, 1999 (DE) .......................... 199 50 504

(51) Int. Cl.[7] .......................... F21V 21/28; F21V 21/29
(52) U.S. Cl. .................. 362/465; 362/464; 362/466; 362/467
(58) Field of Search .................. 362/464, 465, 362/466, 467, 276, 514, 383

(56) References Cited

U.S. PATENT DOCUMENTS

| | | | | |
|---|---|---|---|---|
| 4,286,308 A | * | 8/1981 | Wolff | 362/19 |
| 5,193,894 A | * | 3/1993 | Lietar et al. | 362/66 |
| 5,379,196 A | * | 1/1995 | Kobayashi et al. | 362/61 |
| 5,938,319 A | * | 8/1999 | Hege | 362/459 |
| 5,954,428 A | * | 9/1999 | Eichhorn et al. | 362/543 |
| 6,130,506 A | * | 10/2000 | Lopez et al. | 315/82 |

FOREIGN PATENT DOCUMENTS

DE            38 44 364            7/1990

* cited by examiner

Primary Examiner—Sandra O'Shea
Assistant Examiner—Jacob Y. Choi
(74) Attorney, Agent, or Firm—Crowell & Moring LLP

(57) ABSTRACT

A process and apparatus are provided for the control of the light distribution of a headlight arrangement of a vehicle with at least one first light sensor which senses light emissions acting on a driver from the field of vision in the direction of travel for various areas of the field of vision. A comparator device compares the intensity of the light emissions for each area with a threshold value. A control device controls the light distribution of the headlight arrangement as a function of a signal of the comparator device. In order to provide an improved process and an improved apparatus for the control of the light distribution of a headlight arrangement of a vehicle, it is proposed for the light distribution in the sense of an increase of the illumination of the edge of the road of the driver's own side of the road to provide a turn-off delay combined with a deadtime connected before it. The threshold value for the comparator device is a function of the ambient brightness which is determined over a certain time.

13 Claims, 4 Drawing Sheets

PROCESS AND APPARATUS FOR THE CONTROL OF THE LIGHT DISTRIBUTION OF A HEADLIGHT ARRANGEMENT OF A VEHICLE

This application claims the priority of German Patent Document DE 199 50 504.7, filed Oct. 20 1999, the disclosure of which is expressly incorporated by reference herein.

BACKGROUND AND SUMMARY OF THE INVENTION

The invention relates to a process and apparatus for the control of the light distribution of a headlight arrangement of a vehicle. Preferred embodiments relate to such process and apparatus which includes at least one first light sensor which senses light emissions acting on a driver of the vehicle from an area (I) of the opposite side of the road, a comparator device which compares the intensity of the light emissions in each area with a threshold value, a control device for the light distribution of the headlight arrangement as a function of a signal of the comparator device, where the control device, on overshoot of the threshold value in an area (I) sensing the opposite side of the road, sets the light distribution so that the illumination of an edge of the road of the driver's own side of the road is increased wherein the light distribution in the sense of an increase of the illumination of the edge of the road of the driver's own side of the road a turn-off delay is provided.

In the case of a generic process for the control of the light distribution of a headlight arrangement according to German Patent Document DE 38 44 364 C2, the driver's own side of the road is illuminated at an increased light level to avoid a reduction of the ability of the driver of a vehicle to see when oncoming traffic is present. For this purpose a light sensor registers various areas of a visual field of the driver and the light level for the illumination the driver's own side of the road is increased if a threshold value for the light emissions from the area of the opposite side of the road is exceeded. If, however, a threshold value for the light emissions from the area of the driver's own side of the road is exceeded or a threshold value for the light emissions for an area above the road is exceeded, then the light level is reduced once again. For the increase of the light level, an additional headlight is provided for dimmed light, said additional headlight being switched on in the previously described manner. Alternatively a movable shutter is provided in a headlight already present with which the light distribution can be changed. Instead of the movable shutter the light source can also be shifted, so that the position of the point of highest light intensity shifts.

With respect to this state of the art it is an objective of the invention to provide an improved process and an improved apparatus for the control of the light distribution of a headlight arrangement of a vehicle.

According to the invention this objective is realized by providing a turn-off delay for the light distribution in the sense of an increase of the illumination of the edge of the road of the driver's own side of the road. By this measure the light intensity in the area of the driver's own side of the road is not increased discontinuously but rather gradually. Thereby it is avoided in an advantageous manner that for the driver, whose eyes during the increased illumination had become accustomed to the greater amount of light, a dark space arises after the passing of the oncoming traffic by a sudden withdrawal to the increased illumination in the area of the driver's own side. In addition the number of the switching processes recognizable for the driver is reduced in the case of moderately dense oncoming traffic.

Advantageous extensions of the invention are described below and in the claims.

Thus it is proposed to perform the turn-off delay with a delay of approximately 2 to 10 seconds. This measure is based on the recognition that this time is sufficient so that the eye of the driver can accustom itself to the reduction of illumination. If, in this case, the upper limit is chosen, then the reduction of the illumination for the driver is hardly still perceptible. An additional increase of the delay time then leads to no additional improvement of the adaptation.

Furthermore, it is proposed in addition to the turn-off delay to provide also a turn-on delay. This should then preferably have a delay time of at most 2 seconds. By this measure the turn-on of the additional light acts less irritatingly on the driver. On the other hand it must be noted that a noticeable turn-on is desirable in order to divert the gaze of the driver to the right edge of the road.

Before the turn-off delay a deadtime of up to 3 seconds can be provided in addition in order to compensate for that time span which lies between the point in time at which the oncoming vehicle leaves the sensing area of the light sensor and the point in time at which the oncoming vehicle leaves the area visible to the driver.

For this purpose a light sensor senses various areas of a field of vision of the driver and the light level for the illumination of the driver's own side of the road is increased if a threshold value for the light emissions from the area of the oncoming traffic is exceeded.

Furthermore, it is advantageous if the threshold value for the light emissions from the area of the opposite side of the road at which the illumination of the edge of the road is increased, is determined as a function of ambient brightness. In this case the threshold value should increase with increasing ambient brightness so that the increase of the illumination of the edge of the road is only done when the light emissions from the area of the opposite side of the road lie by a certain amount or percentage above the ambient brightness in order thus to avoid an unnecessary increase of the illumination of the edge of the road.

Also it can be provided to perform the increase of the illumination of the edge of the road only within a predetermined range of speed. The lower limit of this range should be chosen so that it is characteristic for city traffic. In Germany this value can lie around 30 km/h. Thereby it is prevented that within the area of the city (usually illuminated anyway) with partially heavier oncoming traffic, in stop-and-go traffic, in standing traffic (for example, before a stop light) or in congestion by blinking lights, taillights, or reflections a frequent or even continuous additional illumination is triggered in the vehicle traveling forward.

The upper limit of this range should on the contrary be chosen so that it is characteristic for freeway travel. In Germany this value could lie at around 120 km/h. Thereby the illumination of the edge of the road will not be increased unnecessarily on the freeway, on which there can be no oncoming traffic in the direct sense. The limited range would offer moreover no real help at higher speeds.

According to advantageous features of preferred embodiments of the process, it is further proposed to turn headlights on or off for the setting of a light distribution. This setting of the light distribution distinguishes itself by a particularly simple setup and lower control expenditure. In particular it is proposed to provided a dimmed light known in itself for the illumination of the driver's own side of the road and an additional headlight for the illumination of the edge of the road.

Finally, it is proposed according to the apparatus to dispose the light exit area of the additional headlight in the light exit area of a headlight already present. By this measure in an advantageous manner on turning on of the additional headlight no new surface to be illuminated is provided which could distract or even irritate the oncoming driver. For such a common light exit for example, the additional headlight can be disposed in the area of the dimmed light or can be combined with a parking light.

For this purpose a dimmed light and an additional headlight or parking light could, for example, be disposed in a common reflector. It is also contemplated to dispose the additional headlight and the dimmed light under a common cover plate and to illuminate in addition the space formed around the two headlights with the aid of an additional source of illumination, such as, for example, the parking light, so that despite the separate light generation systems the goal of a single headlight is maintained.

Other objects, advantages and novel features of the present invention will become apparent from the following detailed description of the invention when considered in conjunction with the accompanying drawings.

DETAILED DESCRIPTION OF THE INVENTION

Figure 1:
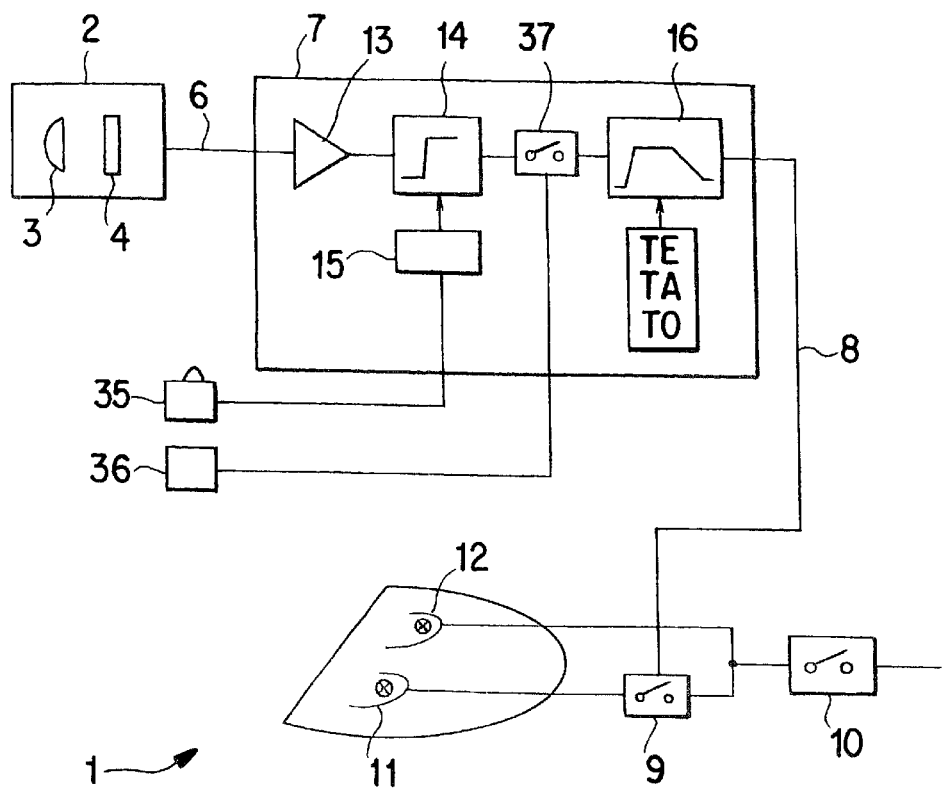
FIG. 1 is a schematic overview representation of a headlight arrangement of a vehicle. constructed according to preferred embodiments of the invention.

The headlight arrangement 1 represented in FIG. 1 of a vehicle not shown in more detail includes a light sensor 2 disposed in the direction of travel of the vehicle which senses light emissions in a field of vision of the driver. The light sensor 2 consists of an imaging optics 3 and a light-sensitive layer disposed in the imaging plane 4. The output signals of the light sensor 2 arrive over a signal line 6 at a control device 7. An output signal 8 of the control device 7 is present on a switching device 9 which acts on a first headlight 11. Thereby the headlight 11 is provided with an additional headlight for the illumination of an edge 24 of the road (represented in FIG. 2) while a second headlight 12 driven by a light switch 10 is a dimmed headlight known in itself. The light switch 10 acts on both headlights 11 and 12. Instead of a positioning motor 34, a solenoid or the like can be provided.

The control device 7 can have on the input side an amplifier 13 for the preparation of the signal coming in over the signal line 6. Connected thereafter is a comparator device 14 which compares the output signal of the amplifier 13 to a signal supplied by a headlight coder 15. The threshold value coder 15 is in this case connected to a sensor 35 which supplies a signal U for the ambient brightness. The sensor 35 is in this case directed upwards. A sliding average calculation is already done within the sensor 35 in order to compensate for short-term influences such as are generated by street lamps, for example. The threshold value coder adapts threshold value supplied to the comparator device to the ambient brightness U in the manner that this threshold value always increases with increasing ambient brightness U. A turn-on and turn-off delayer 16 is connected behind the comparator device 14 and with preset delay times TE for the turn-on delay, TA for the turn-off delay, TO for a deadtime connected before the turn-off delay finally generates the continuously adjustable (dimmable) output signal 8.

The reproduction of the output signal 8 at the switching device 9 is in this case controlled by a switch 37 which is connected to a coder 36 for a speed v. The output signal 8 is in the present example only reproduced when the speed sensed by the coder 36 lies within a range from 30 km/h to 120 km/h. It is also possible to activate the entire control device 7 only within this range of speed v. In addition it can be insured that a turn-off of the control device 7 or the reproduction of the output signal 8 can only be done when the output signal 8 has the value zero. Thus the additional headlight 11 on leaving the range of speed cannot be turned off while operating but rather only the turning on of the additional headlight 11 is suppressed on leaving the range of speed.

Figure 2:
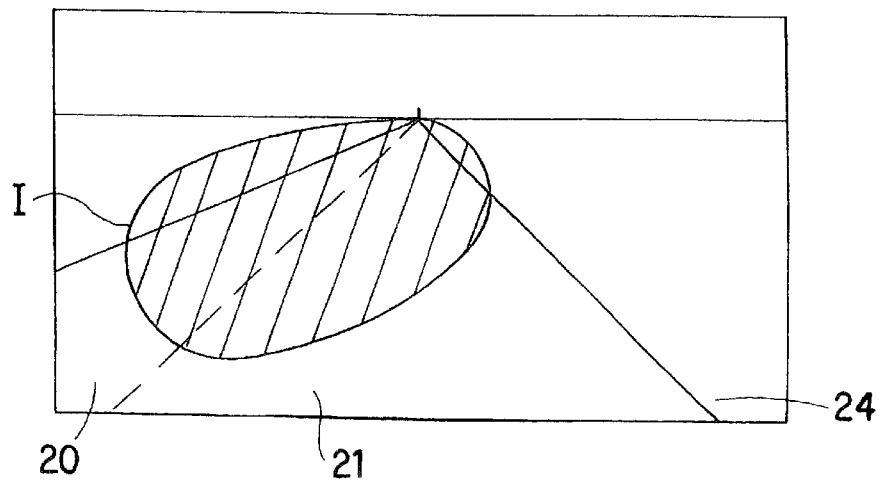
FIG. 2 is a schematic representation of a field of vision of a driver of a vehicle.

FIG. 2 shows the field of vision of the driver received by the light-sensitive field 4. The area I bordered by dash lines stands for the area of the opposite side 20 of the road. The area I is chosen so large that oncoming vehicles are sensed. It has been shown that in this case also a section of the driver's own side of the road should be sensed in order also to be able to recognize oncoming vehicles on curved stretches.

Figure 3:
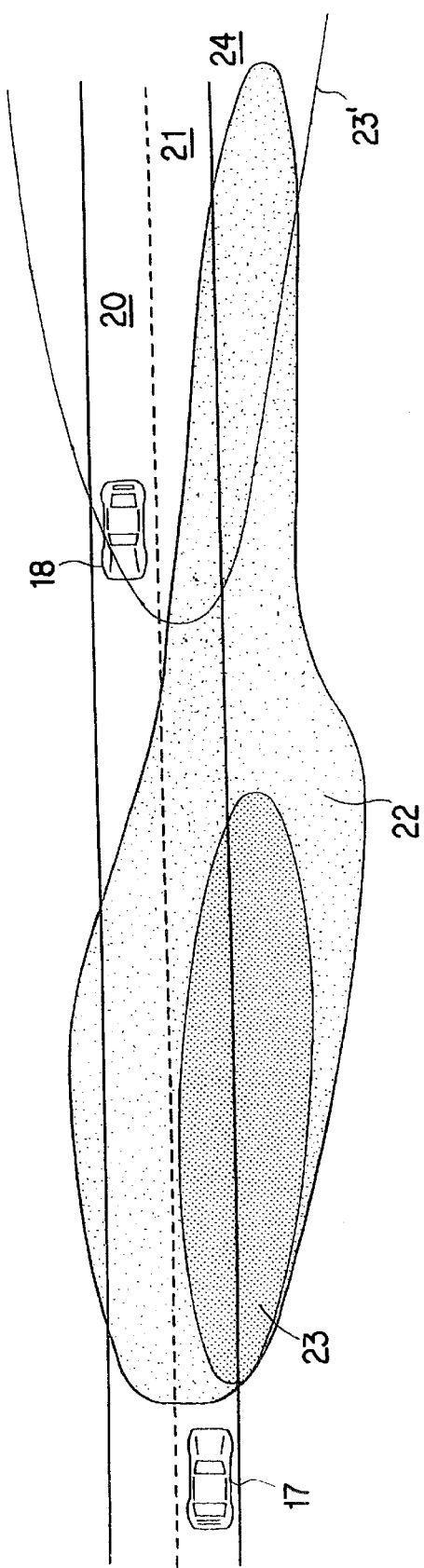
FIG. 3 is a schematic representation from a bird's-eye view of a light distribution for vehicles on a highway.

FIG. 3 shows the light distribution of the headlights 11 and 12 from a bird's-eye view. The vehicle 17 is located on the side 21 of the road appropriate to its direction. An additional vehicle 18 is located on the opposite side 20 of the road. The dimmed headlight 12 of the driver's own vehicle 17 generates the light cone 22 while the additional headlight 11 generates in its starting position the light cone 23. By the positioning motor 34 the additional headlight 11 can be pivoted into a second position 23' in which it can be used as additional high-beam headlight, as a range support for the dimmed light (for example, in freeway driving), or for flashing headlights (advantageous, for example, in connection with a discharge lamp as first headlight 11 for the generation of dimmed light and high-beam light).

The control device 7 continuously compares the signal supplied by the light-sensitive field for the range I with a threshold value stored in the threshold value coder 15 for the range I, said threshold value being adapted continuously to the ambient brightness with the aid of the signal U. If in the comparator device 14 it is recognized that in the range I, i.e. in the range of the opposite side 20 of the road, the light intensity exceeds the limiting value predetermined by the threshold value coder 15, then the control device 7 outputs an output signal 8 which causes the first switching device 9 to turn on the additional headlight 11. By this measure the light cone 22 is expanded by the light cone 23 and an area 24 of the edge of the road is illuminated more strongly (see FIG. 2).

By the—in the area sensed by the light cone 23—clearly increased illumination, the gaze of the driver is automatically drawn away from the opposite side 20 of the road to the now more brightly illuminated edge of the road 24. Thereby blinding caused by a vehicle 18 coming on the opposite side 20 of the road is reduced without the blinding of the oncoming vehicles 18 being increased. The light cone 23 is for this purpose aligned so that no scattered light goes in the direction of the opposite side 20 of the road.

Figure 4:
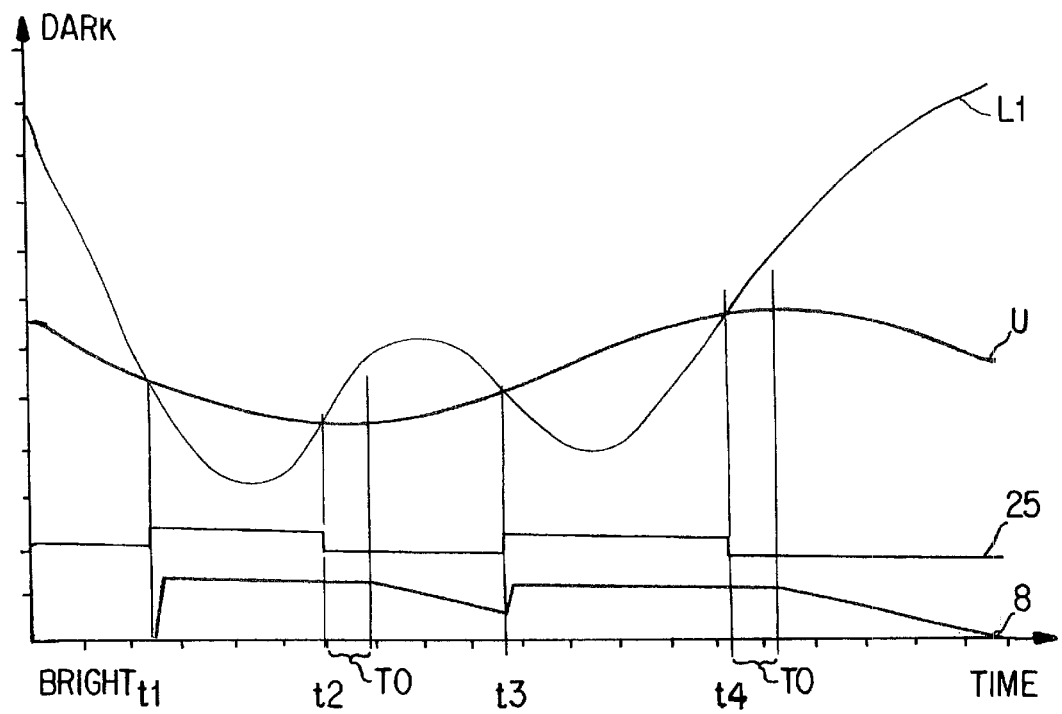
FIG. 4 is a time curve of an output signal generated by a turn-on and turn-off delay for a second headlight of an arrangement constructed according to preferred embodiments of the invention.

FIG. 4 shows the time curve of the output signal 8, the signal U for the ambient brightness, and the signal L1 for the brightness in the area I. In each of the time intervals t1 and t2 as well as t3 and t4 an oncoming vehicle 18 is located on the opposite of the road 20, to be recognized in the signal levels of the signal L1. For the first point in time t1 a first oncoming vehicle 18 is so near to the driver's own vehicle 17 that there is danger of blinding. At that point in time the comparator 14 issues a signal 25 to the turn-on and turn-off delayer 16. Through the turn-on and turn-off delayer 16 the output signal 8 does not immediately reach the value 100% thereupon, but rather only after a preset delay time TE of 0.2 sec. At the point in time t2 the oncoming vehicle 18 passes the driver's own vehicle 17 so that there is no more danger of blinding. At this point in time the signal 25 is cleared. The output signal 8 on the contrary does not fall off immediately to 0%, but rather is first of all held for a deadtime TO of 2 seconds preset in the turn-on and turn-off device 16 and then slowly taken back over a delay time TA, here 3 seconds also preset.

At the third point in time t3 a second vehicle has approached so far that in turn there is danger of blinding. At this point in time t3 the output signal 8 (and thus also the amount of light of the additional headlight 11) has sunk only to 70% and is then raised once again to 100% with the delay time TE preset for the turn-on delay. At the fourth point in time t4 the second vehicle passes the driver's own vehicle 17. Since in the present example no additional vehicle approaches, the output signal 18 then sinks after the expiration of the deadtime TO within the preset delay time TA to 0%, that is, the additional headlight 11 is turned off completely.

The threshold value supplied to the comparator 14 by the threshold value coder 15 in this case is a function of the (average) ambient brightness determined by the sensor 35. The threshold value rises in this case with rising ambient brightness so that as a result the brightness determined for the monitored range I must always lie by a certain amount or percentage above the ambient brightness in order to trigger a turning on of the additional headlight 11.

Figure 5A:
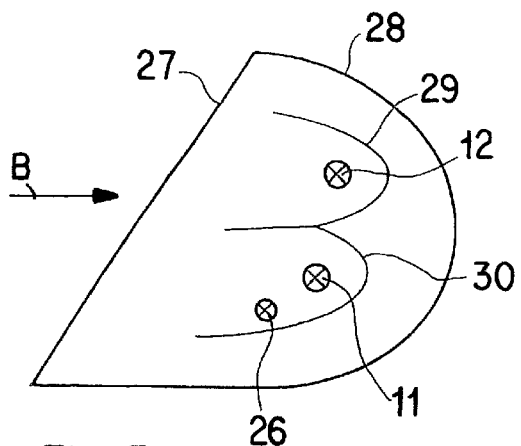
FIG. 5A is a schematic depiction of an arrangement for headlights constructed according to a preferred embodiment of the invention.
Figure 5B:
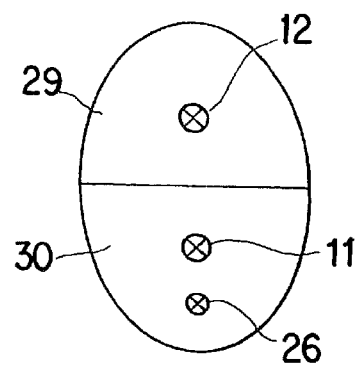
FIG. 5B is a schematic depiction of the headlight of FIG. 5A taken in the direction of arrow B.

Possible configurations of the headlights 11 and 12 are represented in the FIGS. 5A, 5B; 6A, 6B; and 7A, 7B.

Expediently the headlights 11 and 12 can be disposed under a common cover glass 27 in a common housing 28. In addition to the headlights 11 and 12 a parking light 26 is provided.

In the first exemplary embodiment according to FIGS. 5A and 5B the second headlight 12 is provided with its own reflector 29 while an additional reflector 30 is utilized by the additional headlight 11 as well as by the parking light 26.

Figure 6A:
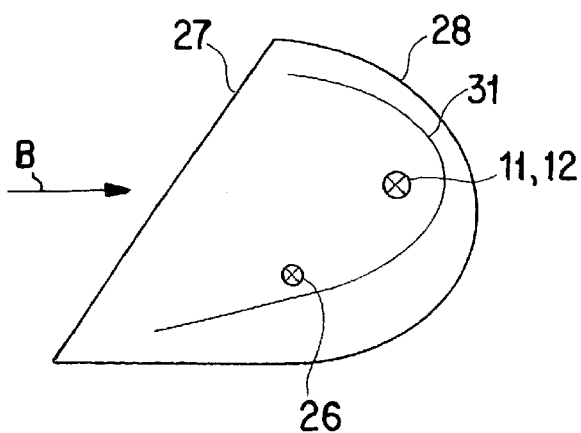
FIG. 6A is a schematic depiction of an alternative arrangement of the headlight in FIG. 5A.
Figure 6B:
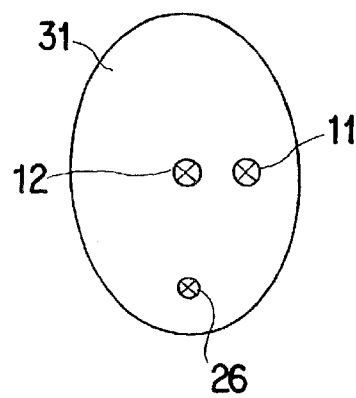
FIG. 6B is a schematic depiction of the headlight of FIG. 6A taken in the direction of arrow B.

On the other hand, in the second exemplary embodiment according to FIGS. 6A and 6B, both headlights 11 and 12 are disposed in a common reflector 31. The additional headlight 11 (more precisely the light source of the additional headlight 11) is in this case disposed offset with respect to the light source for the dimmed headlight 12 in order to generate the desired light bundle 23. The parking light 26 can also be disposed in the single reflector 31.

Figure 7A:
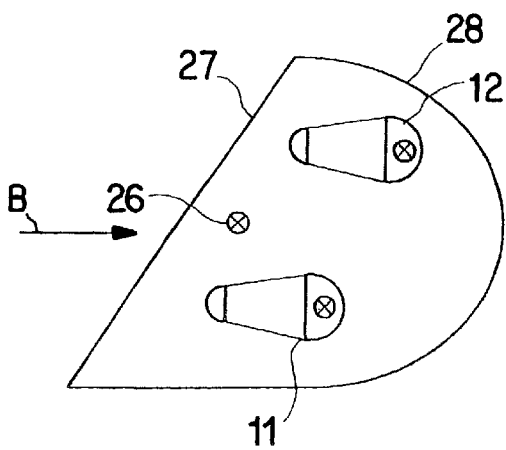
FIG. 7A is a schematic depiction of an additional alternative arrangement for the headlight of FIG. 5A.
Figure 7B:
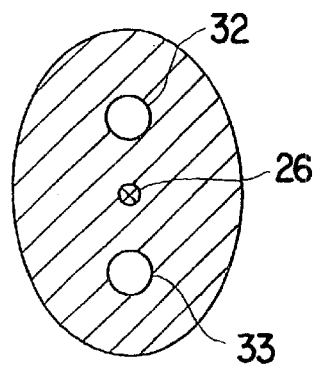
FIG. 7B is a schematic depiction of the headlight of FIG. 7A taken in the direction of arrow B.

In the third exemplary embodiment according to FIGS. 7A and 7B, the headlights 11 and 12 are implemented as separate projection headlights. These generate on the common cover plate 27 separate surfaces 32 and 33 for the passage of light. The parking light 26 is disposed in this case between the headlights 11 and 12 or at another suitable point within the housing 28 so that the light exiting from the parking light 26 illuminates the area lying outside of the surfaces 32 and 33 for the passage of light and represented with hatching of the common cover plate 27. Alternatively, light scattered from the dimmed headlight 12 can be used for illumination. The parking light 26 can be disposed in this case at another point.

In the exemplary embodiments according to FIGS. 5 to 7 it is significant that the additional headlight 11, always in connection with an additional headlight, here the dimmed headlight 12 or the parking light 26, is disposed so that common exit surfaces for the light result. Thus in the exemplary embodiment according to FIGS. 5A and 5B the additional headlight 11 as well as the parking light 26, in the second exemplary embodiment according to FIGS. 6A and 6B the additional headlight 11 and the dimmed headlight 12 and in the third exemplary embodiment according to FIGS. 7A and 7B the additional headlight 11 (or its light-transmitting surface 33) and the parking light 26 each have a common light exit area.

Figure 8:
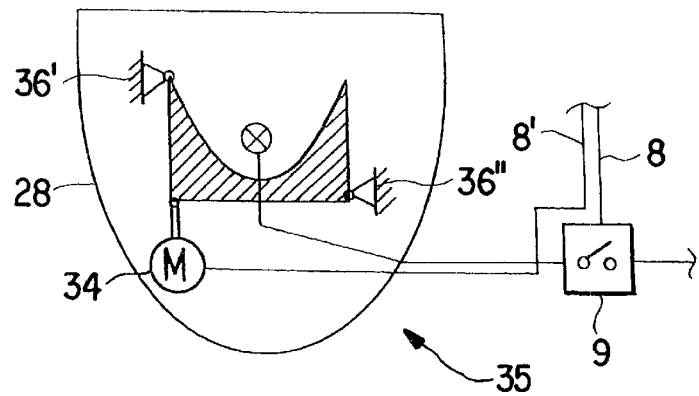
FIG. 8 is a schematic representation of a device for pivoting the headlight of an arrangement constructed according to preferred embodiments of the invention.

FIG. 8 shows schematically a device 35 for the pivoting of the additional headlight 11. As already shown in FIG. 1, the additional headlight 11 is driven from the standpoint of illumination technology via the switching device 9 and the output 8 of the (not represented here) control device 7 while the positioning motor 34 is connected to an output 8' of the control device 7. The additional headlight 11 is mounted in the headlight housing 28 so that it can be pivoted with the aid of two hinges 36' and 36" and can be pivoted via the positioning motor 34 which for this purpose is connected to the additional headlight 11. The range of pivoting is only a few degrees. In its represented starting position the additional headlight 11 generates the light cone 23 (cf. FIG. 3) while in its second position, into which it is pivoted by the positioning motor 34, it generates the light cone 23'.

Figure 9:
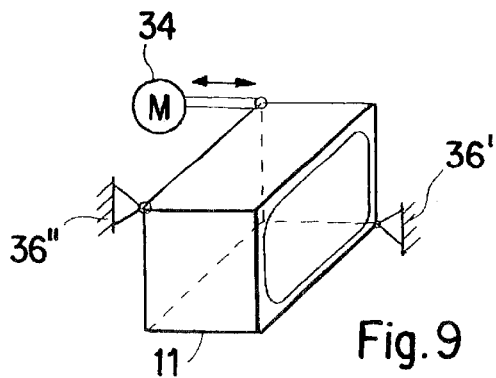
FIG. 9 is a detail representation of hinges according to FIG. 8.

In FIG. 9 the arrangement of the hinges 36' and 36" is represented schematically which is chosen so that a diagonal pivot axis results whose length is chosen so that the additional headlight 11 can be pivoted between it starting position and its second position. The point of engagement of the positioning motor 34 must in this case merely be chosen so that a force engagement axis of the positioning motor 34 does not intersect the pivot axis.

The control device 7 will then drive the positioning motor 34 (and thus pivot the additional headlight 11 in its second position) if, for example, the driver activates flashing lights or if the high beam is turned on. If the control device 7 recognizes freeway travel, the additional headlight 11 can be turned on with the corresponding layout of the illumination (this is a hard light-dark limit in connection with an inclination of approximately −0.2%) also as range support for the dimmed light. As starting position the illumination of the area 24 of the edge of the road is chosen so that in case of a failure of the positioning motor 34 oncoming vehicles 18 are not blinded by the headlight 11 located in the second position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Apparatus for the control of the light distribution of a headlight arrangement of a vehicle, comprising:

at least one first light sensor which senses light emissions acting on a driver of the vehicle from a field of vision in a direction of travel of the road for various areas of the field of vision, a comparator device which compares intensity of the light emissions in each area with a stored threshold value, a control device which sets the light distribution of the headlight arrangement so that the illumination of an edge of the road of the driver's own side of the road is increased if the comparator device determines an overshoot of the threshold value in an area sensing the opposite side of the road, wherein the control device has a turn-off delay device, wherein the control device turns headlights on or off for the setting of a light distribution, wherein the control device turns an additional headlight on for the illumination of the edge of the road, wherein the additional headlight has a common light exit area with at least one other headlight, wherein the additional headlight has a common light exit area with at least one other headlight, and wherein the additional headlight and the other headlight have a common cover plate.

2. Apparatus according to claim 1, wherein the turn-off delay has a delay time (TA) in the range of 1 to 10 seconds.

3. Apparatus according to claim 2 comprising a turn-on delay which has a delay time (TE) in the range of 0 to 2 seconds.

4. Apparatus according to claim 2, wherein a dead time (TO) in the range of 0 to about 3 seconds is provided before the turn-off delay.

5. Apparatus according to claim 1 comprising a turn-on delay which has a delay time (TE) in the range of 0 to 2 seconds.

6. Apparatus according to claim 5, wherein a dead time (TO) in the range of 0 to about 3 seconds is provided before the turn-off delay.

7. Apparatus according to claim 1, wherein a dead time (TO) in the range of 0 to about 3 seconds is provided before the turn-off delay.

8. Apparatus according to claim 1, wherein the additional headlight is combined with a dimmed light.

9. Apparatus according to claim 8, wherein the additional headlight and the other headlight have a common reflector.

10. Apparatus according to claim 8, wherein the additional headlight and the dimmed light are disposed under the common cover plate where separate light exit areas are provided for each of the additional light and the dimmed light and the remaining area of the cover plate is illuminated in addition.

11. Apparatus according to claim 10, wherein the additional headlight and the other headlight have a common reflector.

12. Apparatus according to claim 1, wherein the additional headlight and the other headlight have a common reflector.

13. Apparatus according to claim 12, wherein the additional headlight and the dimmed light are disposed under the common cover plate where separate light exit areas are provided for each of the additional light and the dimmed light and the remaining area of the cover plate is illuminated in addition.

* * * * *